UNITED STATES PATENT OFFICE.

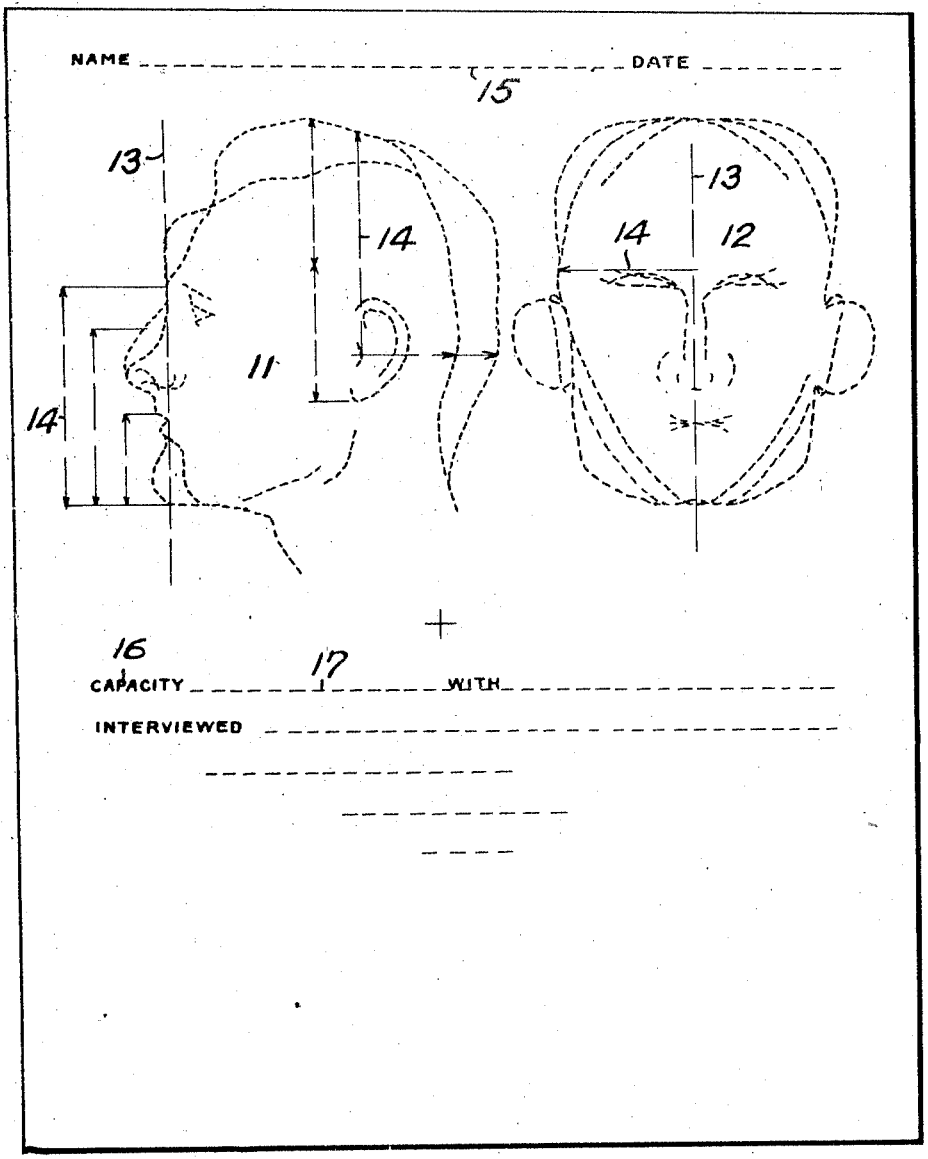

JOHN C. FRUIT, OF MONTREAL, QUEBEC, CANADA.

RECORD SYSTEM.

1,367,034.   Specification of Letters Patent.   Patented Feb. 1, 1921.

Application filed January 26, 1920. Serial No. 353,955.

*To all whom it may concern:*

Be it known that I, JOHN C. FRUIT, a citizen of the United States, and resident of the city of Montreal, in the Province of Quebec and Dominion of Canada, have invented certain new and useful Improvements in Record Systems, of which the following is a full, clear, and exact description.

This invention relates to improvements in recording systems, and the object of the invention is to provide means for recording data relative to the personality, character, habits and the like for use in business.

A further object is to provide a convenient means for utilizing, in business, the knowledge obtained from the study of physical characteristics.

At the present time the determination of character, based on certain physical formations, has been brought to a more or less high degree of perfection and a person having a thorough knowledge of the various physical characteristics and what they imply can, to a considerable degree, determine the character, habits, weaknesses and mental ability of a complete stranger and thus be enabled to present a business or other proposition in the way which will be most productive of the desired result. It is, however, necessary for a person thus skilled to see the subject in order to determine the best method of approach. It is therefore impossible for any one, no matter how skilled in the art, to ascertain the best line of approach when dealing with an unknown subject by correspondence or telephone. It is, moreover, a difficult and tedious task to set down in writing the deductions made after a personal interview and the value of the record will be minimized by the length of time required to read and digest the written matter at a considerably later date.

A system according to this invention includes a plurality of record cards arranged to record visually the physical characteristics necessary for the deductions previously mentioned in order that one skilled in the art of character reading and provided with such a record may form a very rapid and accurate estimate of the character of a perfect stranger, or may refresh his memory as to the characteristics of a person that he has not seen for a considerable period. The system is preferably so arranged that a mere novice in the art or any one having even a meager ability as a draftsman may obtain a record in even a casual interview which will be of great assistance to one skilled in the art.

In the drawing a single card of the system is illustrated. This card, which shows cranial characteristics, is inscribed with the representation 11 of a composite profile showing the principal extremes of cranial and facial formation and with a similar representation 12 of a composite full face view illustrating the same characteristics and in addition others which do not appear in a profile. It will be seen that the representation 11 shows the extremes of skull, nasal, chin and jaw formation while these showings are further amplified in the full face view 12 and various other formations such as eyebrow direction, nose-width and mouth-curvature illustrated as well as skull and jaw-width. These diagrams 11 and 12 are preferably inscribed in light dotted lines as illustrated and provided with guide lines 13. Various lines 14 may also be provided indicating measurements between various points. At the top of the card a line 15 is provided preferably for the inscription of a name so as to facilitate selection of the desired record. Below the diagrams suitable printed matter 16 and blank lines 17 for filling in may be provided in order to facilitate the inscription of a brief written record of the subject and for the inscription of any desired data.

The record is made by drawing over or between the lines of the diagrams the representation of a person who has been interviewed. The various dotted lines serve as a reminder and guide for one not skilled in character-reading or possessing great artistic ability so that such a person may, after interviewing a stranger, make a fairly accurate drawing of such person, showing the physical characteristics and may then inscribe the name of the subject, the date of the interview and any other neccessary matter.

The measurements which apply to the record thus made may be indicated by drawing in the dimension lines to the proper distance or by other suitable marks. If, for example, the subject interviewed has an abnormally high or abnormally low eyebrow this fact will be indicated by extending or shortening the dimension line 14 extending from chin to eyebrow in the profile diagram 11. Obviously the more skilled the interviewer is in the art the more informative will be the record which he produces on the diagram. A record thus made may be filed away according to any suitable plan. A person skilled in the art of character-reading may, before interviewing or writing a perfect stranger, examine the record made by some one else and obtain at a glance a good working knowledge of the characteristics, habits, weaknesses and mentality of the subject and thus be able to deal most effectively with a person. The facts contained in the written record may assist but much more can be gathered in a momentary glance at the visual record than could be gathered in several minutes study of the written record. Owing to the guide lines of the diagrams different people with different artistic ability and with and without knowledge of the particular art will produce very similar diagrams of a given person. Whereas, if left to form an opinion and record same in words the results would differ widely.

It will thus be seen that by means of this system a very accurate record of character, etc., may be easily made and kept which will be of great value for example to salesmen approaching a previous unknown customer or prospect. Such salesman having first obtained a working knowledge of the art can, from a study of the diagrams of the record, ascertain with great certainty the best method of approaching the customer or prospect and can, therefore, gain the desired result with less expenditure of time and energy and without inadvertently producing in the customer or prospect any undesirable attitude.

While a record card of the system has been shown in its most simple form it will be understood that further diagrams may be placed on the card or on separate cards employing the same principle and having reference in detail to individual characteristics or features. In this way noses, ears, eyes, mouths, chins, and hands may be treated individually.

While the record diagrams have previously been described as inscribed on a card it will be understood that the word "card" is not limitive as the diagrams may be inscribed on the fixed or separable sheets or leaves of a book or on slips of paper which can be mounted in a book or on cards.

Having thus described my invention, what I claim is;—

1. A record system including a series of sheets each inscribed with outlined diagrams of extremes of physical characteristics forming guide lines, and dimension lines in operative relation to certain of the physical characteristics for a purpose specified.

2. A record system including a series of sheets each inscribed with outlined diagrams of extremes of the physical characteristics forming guide lines, dimension lines in operative relation to certain of the characteristics of the outlined diagrams, and further lines and descriptive matter for a written amplification of the visual record.

In witness whereof, I have hereunto set my hand.

JOHN C. FRUIT.